United States Patent
Xi et al.

(10) Patent No.: US 11,575,721 B2
(45) Date of Patent: *Feb. 7, 2023

(54) BREAKOUT SESSION ASSIGNMENT BY DEVICE AFFILIATION

(71) Applicant: Cisco Technology, Inc., San Jose, CA (US)

(72) Inventors: Yasi Xi, Hefei (CN); Bhargavkumar Ghanshyamlal Pandya, Dublin, CA (US); Zhaoyi Jin, Hefei (CN); Weiwei Chen, Hefei (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,681

(22) Filed: Apr. 22, 2022

(65) Prior Publication Data

US 2022/0377117 A1    Nov. 24, 2022

Related U.S. Application Data

(63) Continuation of application No. 17/325,758, filed on May 20, 2021, now Pat. No. 11,323,493.

(51) Int. Cl.
*H04L 65/401* (2022.01)
*H04L 12/18* (2006.01)
(Continued)

(52) U.S. Cl.
CPC ...... *H04L 65/4015* (2013.01); *H04L 12/1818* (2013.01); *H04L 12/1822* (2013.01);
(Continued)

(58) Field of Classification Search
None
See application file for complete search history.

(56) References Cited

U.S. PATENT DOCUMENTS 7,058,168 B1 * 6/2006 Knappe ............... H04M 3/56
709/204
8,126,129 B1 * 2/2012 McGuire ............. H04M 3/568
379/202.01

(Continued)

OTHER PUBLICATIONS

Webex Meetings, "Breakout Sessions", Nov. 2, 2020, 3 pages; https://help.webex.com/en-us/nroo6fs/Webex-Meetings-Breakout-Sessions.

(Continued)

*Primary Examiner* — Backhean Tiv
(74) *Attorney, Agent, or Firm* — Edell, Shapiro & Finnan, LLC (57) ABSTRACT

Presented herein are techniques in which a device connects a plurality of user devices to a communication session in which a plurality of participants of the respective plurality of user devices communicate using audio and/or video and determines respective locations of the plurality of user devices. The devices receives, from a particular user device of the plurality of user devices, a request to group the user devices into a plurality of groups to form one or more breakout communication sessions off of the communication session, assigns user devices to respective ones of the plurality of groups based on the respective locations such that user devices at a common location are assigned to a same group, and transmits information identifying the plurality of groups to the particular user device.

20 Claims, 8 Drawing Sheets

(51) Int. Cl.
*H04L 65/1096* (2022.01)
*H04L 65/403* (2022.01)
*H04L 65/1069* (2022.01)
*H04L 65/1093* (2022.01)
*H04M 3/42* (2006.01)
*H04M 3/56* (2006.01)

(52) U.S. Cl.
CPC ...... *H04L 65/1069* (2013.01); *H04L 65/1093* (2013.01); *H04L 65/1096* (2013.01); *H04L 65/403* (2013.01); *H04M 3/42348* (2013.01); *H04M 3/568* (2013.01)

(56) References Cited

U.S. PATENT DOCUMENTS

| | | | | |
|---|---|---|---|---|
| 8,589,487 | B1* | 11/2013 | Reeves | H04L 65/403 709/204 |
| 8,917,847 | B2* | 12/2014 | Mai | H04M 3/563 709/204 |
| 9,420,108 | B1* | 8/2016 | Bostick | H04L 67/535 |
| 9,942,519 | B1* | 4/2018 | Pan | H04N 21/47 |
| 9,961,119 | B2* | 5/2018 | Bader-Natal | H04L 65/403 |
| 10,284,609 | B2* | 5/2019 | Malatesha | H04L 65/403 |
| 10,505,998 | B1* | 12/2019 | Ackerman | H04L 65/4025 |
| 11,323,493 | B1* | 5/2022 | Xi | H04L 65/403 |
| 2005/0078613 | A1* | 4/2005 | Covell | H04L 65/1101 370/260 |
| 2005/0084086 | A1* | 4/2005 | Hesse | H04M 3/567 379/202.01 |
| 2006/0268751 | A1* | 11/2006 | Baird | H04L 12/1822 370/260 |
| 2007/0067387 | A1* | 3/2007 | Jain | G06Q 10/10 709/204 |
| 2007/0150583 | A1* | 6/2007 | Asthana | G06Q 10/06 709/224 |
| 2007/0156811 | A1* | 7/2007 | Jain | H04L 12/1827 709/204 |
| 2007/0203980 | A1* | 8/2007 | Andersen | G06Q 10/10 709/204 |
| 2007/0276908 | A1* | 11/2007 | Asthana | H04M 3/567 709/204 |
| 2007/0299710 | A1* | 12/2007 | Haveliwala | G06Q 10/10 705/7.19 |
| 2007/0300165 | A1* | 12/2007 | Haveliwala | G06F 3/0482 715/810 |
| 2008/0267095 | A1* | 10/2008 | Sekaran | H04L 12/66 370/260 |
| 2010/0124321 | A1* | 5/2010 | Alexandrov | H04M 3/56 379/202.01 |
| 2011/0014929 | A1* | 1/2011 | Moshfeghi | H04L 67/52 455/456.3 |
| 2011/0271212 | A1* | 11/2011 | Jones | H04M 3/567 715/753 |
| 2012/0221639 | A1* | 8/2012 | Mallet | G06F 16/287 709/204 |
| 2013/0066623 | A1* | 3/2013 | Chou | H04L 65/612 348/14.09 |
| 2013/0198635 | A1* | 8/2013 | Jones | G06F 3/0486 715/727 |
| 2013/0329866 | A1* | 12/2013 | Mai | H04M 3/563 379/88.01 |
| 2014/0267550 | A1* | 9/2014 | Nimri | H04N 7/152 348/14.09 |
| 2015/0109399 | A1 | 4/2015 | Kuscher et al. | |
| 2015/0117626 | A1 | 4/2015 | Nord | |
| 2015/0181165 | A1* | 6/2015 | Iltus | H04N 7/15 348/14.09 |
| 2015/0304607 | A1* | 10/2015 | Bader-Natal | H04L 12/1813 348/14.08 |
| 2016/0021035 | A1* | 1/2016 | Shen | H04L 12/1818 709/206 |
| 2016/0142462 | A1* | 5/2016 | Johnston | G10L 17/00 709/205 |
| 2016/0234268 | A1* | 8/2016 | Ouyang | H04L 67/54 |
| 2017/0272263 | A1 | 9/2017 | Riley et al. | |
| 2018/0115432 | A1 | 4/2018 | Cutler et al. | |
| 2018/0176508 | A1* | 6/2018 | Pell | H04L 65/1089 |
| 2018/0220181 | A1* | 8/2018 | Ogle | H04N 21/4516 |
| 2018/0316893 | A1* | 11/2018 | Rosenberg | H04N 7/152 |
| 2019/0297126 | A1* | 9/2019 | Graziano | H04L 51/08 |
| 2020/0382618 | A1* | 12/2020 | Faulkner | H04L 65/403 |
| 2021/0021440 | A1* | 1/2021 | Stuntebeck | H04L 67/141 |
| 2021/0258427 | A1* | 8/2021 | Lee | H04L 12/1831 |
| 2021/0273913 | A1* | 9/2021 | Bosch | H04L 12/4641 |
| 2021/0365234 | A1* | 11/2021 | Ur | G10L 21/0208 |

OTHER PUBLICATIONS

Zoom Help Center, "Enabling breakout rooms", retrieved from Internet Apr. 7, 2021, 3 pages; https://support.zoom.us/hc/en-us/articles/206476093-Enabling-breakout-rooms.

Webex Meetings, "Assign Participants to a Breakout Session", Sep. 10, 2020, 5 pages; https://help.webex.com/en-us/n4jhmhe/Webex-Meetings-Assign-Participants-to-a-Breakout-Session.

* cited by examiner

BREAKOUT SESSION ASSIGNMENT BY DEVICE AFFILIATION

CROSS-REFERENCE TO RELATED APPLICATIONS

This application is a continuation of U.S. patent application Ser. No. 17/325,758, filed May 20, 2021, the entirety of which is incorporated herein by reference.

TECHNICAL FIELD

The present disclosure relates to online meeting breakout sessions.

BACKGROUND

Breakout sessions or breakout rooms are now popular in online meetings. A meeting host or cohost can create breakout sessions from a main meeting and assign participants of the main meeting to different breakout sessions. This assignment can be manual or automatic.

DESCRIPTION OF EXAMPLE EMBODIMENTS

Overview

Presented herein are systems and methods for automatically suggesting physical location-based breakout session assignments for online meetings. The methods involve connecting a plurality of user devices to a communication session in which a plurality of participants of the respective user devices communicate using audio and/or video and determining respective locations of the plurality of user devices. The methods further involve receiving, from a particular user device of the plurality of user devices, a request to group the user devices into a plurality of groups to form one or more breakout sessions off the communication session, assigning user devices to respective ones of the plurality of groups based on the respective locations such that user devices at a common location are assigned to a same group, and transmitting information identifying the plurality of groups to the particular user device.

EXAMPLE EMBODIMENTS

In an online meeting space environment, participants and/or users (these terms are used interchangeably throughout the description) are participating via their respective devices that may be geographically remote from each other. The participant and the respective user (client) device, such as a computer, laptop, tablet, smart phone, etc., may collectively be referred to as endpoints, user devices, or devices. The devices may communicate with each other via one or more networks such as the Internet.

Some of the devices may have video capabilities in a communication session. Video capabilities may include, but are not limited to, live feed of a respective participant on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of a limitation.

Figure 1:
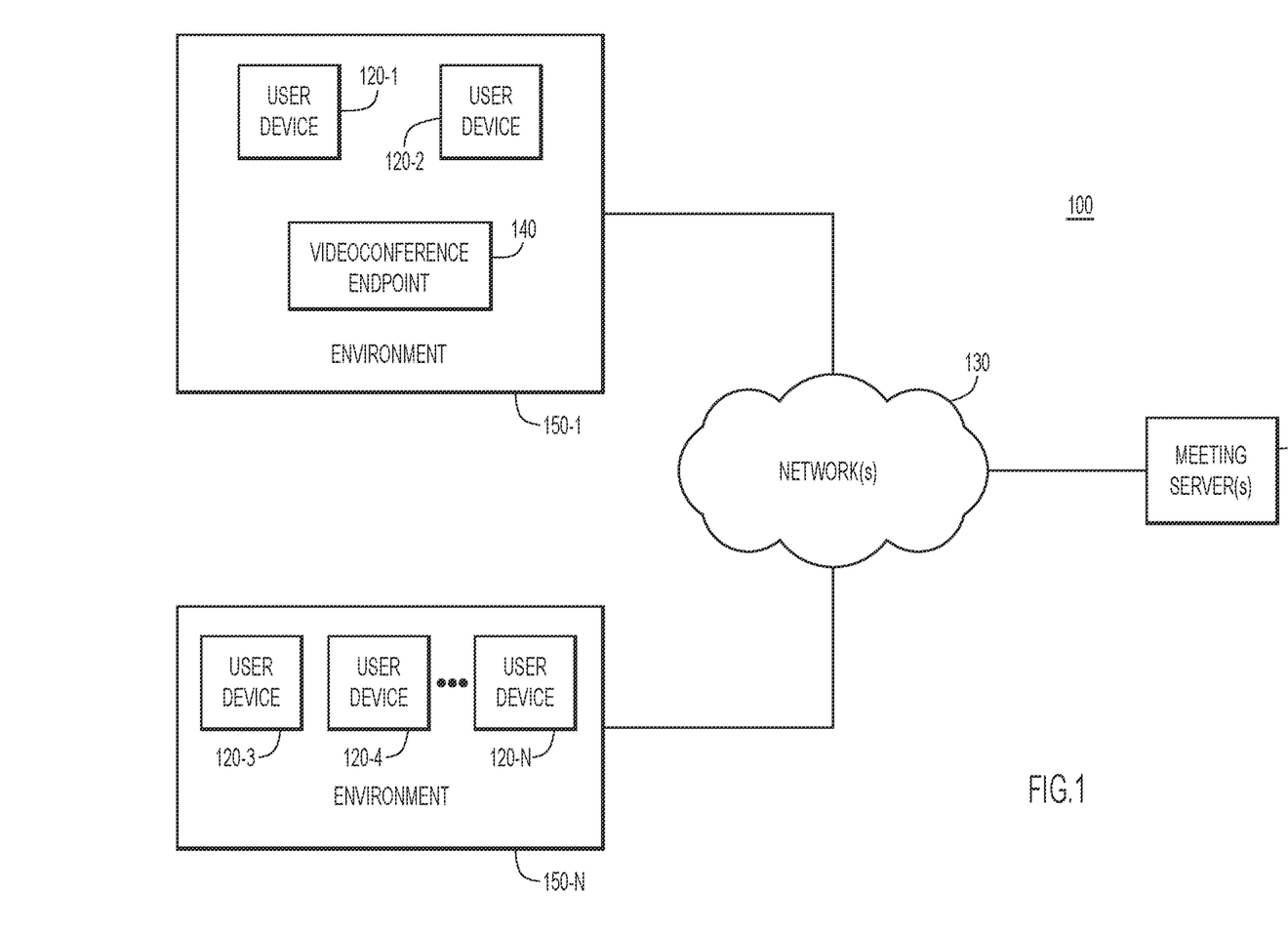
FIG. 1 is a block diagram of a system configured to provide a communication session among a plurality of participants and for which breakout session group assignment may be performed, according to an example embodiment.

Reference is first made to FIG. 1. FIG. 1 shows a block diagram of a system 100 that is configured to provide online meeting services that include services for recommending breakout or child sessions for online meetings. The system 100 includes one or more meeting server(s) 110 and a plurality of user devices 120-1 to 120-N that communicate with meeting server(s) 110 via one or more networks 130. The meeting server(s) 110 are configured to provide an online meeting service for hosting a communication session among user devices 120-1 to 120-N and for recommending groups of the user devices 120-1 to 120-N for conducting breakout or child sessions of the communication session. The user devices 120-1 to 120-N may be tablets, laptop computers, desktop computers, Smartphones, virtual desktop clients, or any user device now known or hereinafter developed that can run a meeting client or similar communication functionality. The user devices 120-1 to 120-N may have a dedicated physical keyboard or touch-screen capabilities to provide a virtual on-screen keyboard to enter text. The network(s) 130 may include wired local and wide-area networks as well as wireless local and wide-area networks. The user devices 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

Groups of user devices 120-1 to 120-N may be located in common environments 150-1 to 150-N. An environment 150-1 to 15-N may be a room, such as a conference room, in which the users have gathered for participating in an online meeting. As shown in FIG. 1, user devices 120-1 and 120-2 are located in environment 150-1 and user devices 120-3 to 120-N are located in environment 150-N. Environment 150-1 includes a videoconference endpoint 140. As shown in FIG. 1, user devices 120-1 and 120-2 are in an environment 150-1 that includes the videoconference endpoint 140 and may be connected to or associated with ("paired" to) the videoconference endpoint 140 for participating in the online meeting or communication session. Each user device 120-1 to 120-N provides information regarding a location of the user device to meeting server(s) 110 so that the user devices may be grouped based on location. If a user device is located in an environment, such as environment 150-1 that includes a videoconference endpoint 140, the location information may include information associated with the videoconference endpoint 140. That is, the location of user devices 120-1 and 120-2 may be derived based on their association to the videoconference endpoint 140 which is at a location known to the meeting server(s) 110. If the user device is not located in an environment that includes a videoconference endpoint, such as is the case for environment 150-2, the location of a user device may include information associated with another user device in the environment that is acting as a delegate device. The location information may additionally or alternatively include or be derived from background noise characteristics, short-range wireless system identifiers (such as a Bluetooth™ wireless system) of neighboring user devices, facial and/or voiceprint information, and/or geo-location information input by a user.

At a high level, these techniques presented herein involve forming groups of user devices that are participating in an online meeting or communication session based on a common location of the user devices to form location-based breakout sessions or child sessions of the communication session. In other words, the locations of user devices are used to inform the assignment of user devices to breakout sessions such that user devices at the same location are assigned to the same breakout session.

Figure 2:
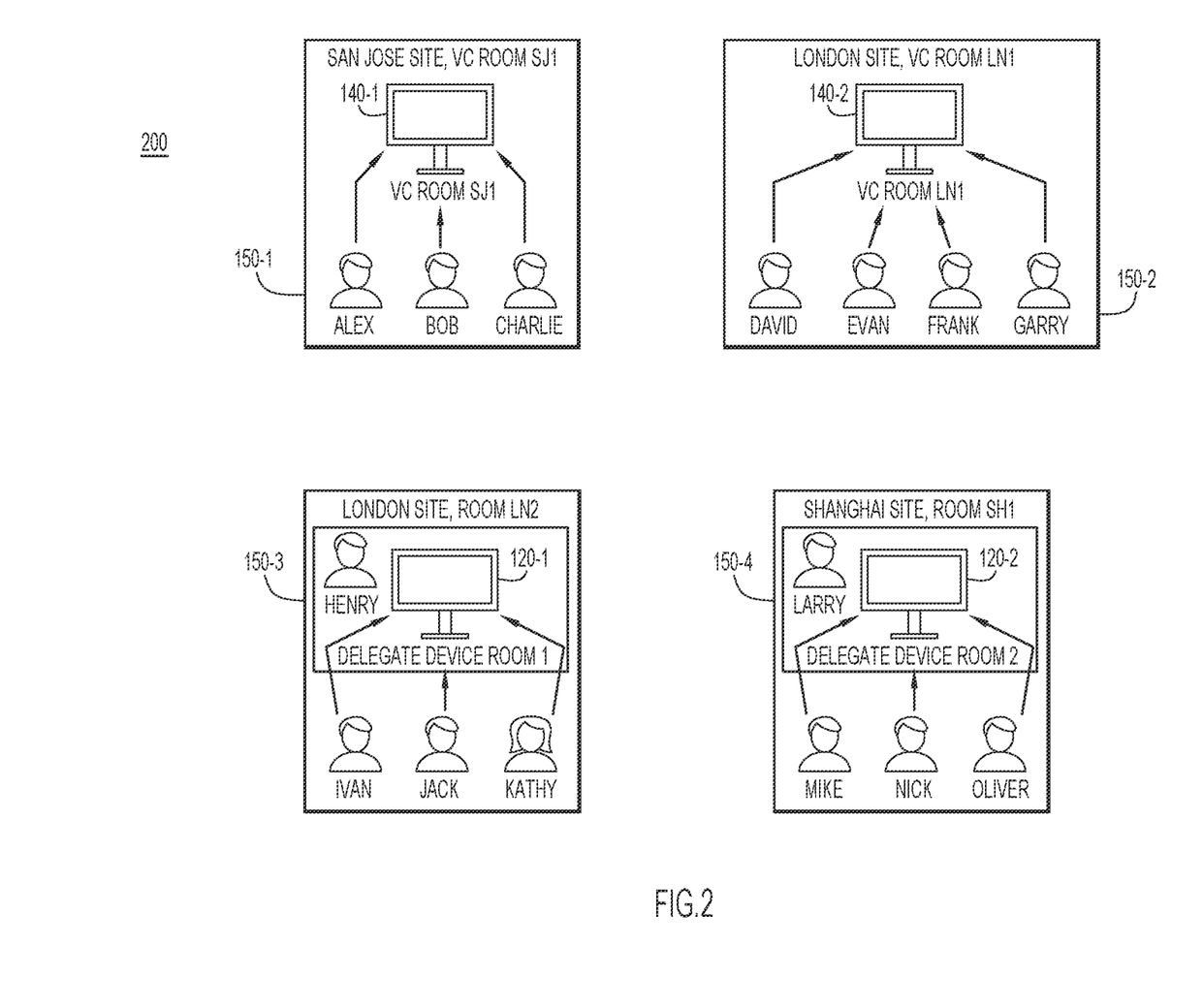
FIG. 2 is a diagram depicting a method for transmitting location information for user devices based on device affiliation detection for determining breakout session groups, according to an example embodiment.

Reference in now made to FIG. 2, with continued reference to FIG. 1. FIG. 2 is a diagram depicting a method 200 for transmitting location information for user devices based on device affiliation detection, according to an example embodiment. The method 200 may be performed by one of the user devices 120-1 to 120-N or a videoconference endpoint 140 of FIG. 1.

FIG. 2 depicts environments 150-1 to 150-4. In the example shown in FIG. 2, environment 150-1 is a room (Videoconferencing (VC) Room SJ1) in San Jose that includes videoconference endpoint 140-1 and three users (Alex, Bob, and Charlie). Environment 150-2 is a room (VC Room LN1) in London that includes videoconference endpoint 140-2 and four users (David, Evan, Frank, and Garry). Environment 150-3 is a room (Room LN2) in London that includes four users (Henry, Ivan, Jack, and Kathy) and no videoconference endpoint. Environment 150-4 is a room (Room SH1) in Shanghai that includes four users (Larry, Mike, Nick, and Oliver) and no videoconference endpoint. All users in environments 150-1 to 150-4 are participants in an online meeting.

In environment 150-1, Alex, Bob, and Charlie join the meeting with their user devices connected to or associated with videoconference endpoint 140-1. In environment 150-2, David, Evan, Frank, and Garry join the meeting with their user devices connected to or associated with videoconference endpoint 140-2. In environment 150-3, Henry, Ivan, Jack, and Kathy join the meeting from Room LN2 in London, but their user devices are not associated with a videoconference endpoint because there is no videoconference endpoint located in the room. Similarly, in environment 150-4, Larry, Mike, Nick, and Oliver join the meeting from Room SH1 in Shanghai, but their user devices are not associated with a videoconference endpoint.

A host or cohost of the online meeting or communication session may request that breakout sessions of the communication session be created for the meeting. Creating a breakout session may include dividing the meeting participants into smaller groups of meeting participants to conduct a meeting or communication session with fewer participants than in the main meeting. Users participating in a breakout session may view and communicate with only the other users in the same breakout session. In this scenario, when a host or cohost of the online meeting requests to create breakout sessions, it may be natural and desirable to consider participants in the same room as a group and, therefore, to create four breakout sessions with one session for each room.

In the example shown in FIG. 2, a first breakout session may include the participants from VC Room SJ1 (Alex, Bob, and Charlie), a second breakout session may include the participants from VC Room LN1 (David, Evan, Frank, and Garry), a third breakout session may include the participants from Room LN2 (Henry, Ivan, Jack, and Kathy), and a fourth breakout session may include the participants from Room SH1 (Larry, Mike, Nick, and Oliver). The assignment of participants in each breakout session may be based on device affiliation detection. The device affiliation detection may be based on users joining the meeting by connecting to or being associated with a videoconference endpoint in the room or based on users joining the meeting without connecting to a videoconference endpoint 140, but using other techniques for device affiliation detection described below.

In the example shown in environment 150-2 in FIG. 2, David, Evan, Frank, and Garry join the meeting from VC Room LN1 in London by connecting to or associating with videoconference endpoint 140-2. While the users are participating in the meeting using their user devices, each meeting client of the user devices reports to meeting server(s) 110 "I'm connected to the videoconference endpoint device with device number 12345 in VC Room LN1 in the London site." When the main meeting host or cohost creates breakout sessions, the meeting client of the host or cohost's user device may suggest that David, Evan, Frank, and Garry be in the same breakout or child session based on determining that David, Evan, Frank, and Garry are connected to the same videoconference endpoint and are, therefore, at the same location. A videoconference endpoint room icon may be displayed in the breakout session user interface to indicate the device affiliation.

A breakout room assignment suggestion may be presented to the host or cohost, as set forth below:

| Participants from an endpoint room | Suggested child session |
|---|---|
| London site VC Room LN1 | Child session (VC Room LN1, London) |
| David | David |
| Evan | Evan |
| Frank | Frank |
| Garry | Garry |

There is a heartbeat detection for each participant in the room with a periodic interval (e.g. every 5 seconds). Once a participant leaves the room and the participant's user device can no longer detect the videoconference endpoint in that room, the participant will be eliminated from the group.

In the example illustrated in environment 150-3 of FIG. 2, participants Henry, Ivan, Jack, and Kathy join the meeting from Room LN2 in London. When the participants join the meeting, no videoconference endpoint can be detected by the meeting clients on the user devices because there is no videoconference endpoint in environment 150-3 to emit a signal.

In this case, the first meeting client in the room (e.g. Henry's user device 120-1), may take the role of a delegate device with a virtual device number (e.g., 23456) and a virtual room name (e.g., Room1) and will emit a signal (e.g. by ultrasound, Bluetooth, etc.) containing meeting information associated with the online meeting (e.g., a meeting number, etc.). When other participants in the room join the meeting, their user devices can detect and connect to the delegate device and report to the meeting server: "I'm connected to the videoconference device with device number 23456 in Room1." When the main meeting host or cohost creates breakout sessions, the host or cohost's meeting client may suggest that Henry, Ivan, Jack, and Kathy be in the same child or breakout session based on determining that Henry, Ivan, Jack, and Kathy are located in the same room. The virtual device number and the virtual room name may be assigned by meeting server(s) 110. The virtual room name indicates that the participants of this session are physically located in the same room. A room icon may be displayed in the breakout session user interface to indicate the physical proximity.

A breakout room assignment suggestion may be presented to the host or cohost, as set forth below:

| Participants from a non-VC endpoint room | Suggested child session |
|---|---|
| London site | Child session 3 (Room1) |
| Room LN2 | |
| Henry | Henry |
| Ivan | Ivan |
| Jack | Jack |
| Kathy | Kathy | user devices of all the participants in a nearby physical location are candidates to become the new delegate device. When the delegate device is no longer emitting a signal, each user device determines whether a new signal can be detected. If a new signal is detected, the user device recognizes the delegate device information from the signal, connects to the delegate device, and reports to the meeting server(s) 110 about the affiliation. If the signal is not detected, the user device waits for a period of time (e.g. 235 milliseconds), and determines whether the signal can be detected. If no signal is detected, a user device emits its own signal claiming "I'm the new delegate device with device number 23456." The user devices detecting the signal will connect to the new delegate device. Thus, the first user device that makes the claim that it is the new delegate device is promoted to be the new delegate device and a self-organized affiliation relationship is established.

In some situations, breakout or child sessions may be determined when only some of the user devices in a room are connected to the videoconference endpoint 140 in the room. For example, assume that David and Evan in environment 150-2 of FIG. 2 join the meeting from VC Room LN1 in London by connecting to videoconference endpoint 140-2, but Frank and Garry join the meeting in the same room without connecting to videoconference endpoint 140-2. In this case, the user devices of David and Evan will report to meeting server(s) 110: "I'm connected to the videoconference endpoint with device number 12345 in VC Room LN1 in the London site." Although the user devices of Frank and Garry have not connected to the videoconference endpoint 140-2 in environment 150-2, the user devices can detect endpoint device 140-2 in the room, so the user devices of Frank and Garry will report to meeting server(s) 110: "I'm close to the videoconference endpoint with device number 12345 in Endpoint Room LN1 in the London site." When the main meeting host or cohost creates breakout or child sessions, the meeting client on the host or cohost's user device may suggest that David, Evan, Frank, and Garry be in the same breakout session based on determining that David, Evan, Frank, and Garry are all in the same location.

A breakout room assignment suggestion may be presented to the host or cohost, as set forth below:

| Participants from a partial-affiliated TP room | Suggested child session |
|---|---|
| London site | Child session (Endpoint Room LN1, London) |
| Endpoint Room LN1 | |
| David (connected to videoconference device) | David |
| Evan (connected to videoconference endpoint) | Evan |
| Frank (not connected to videoconference endpoint) | Frank |
| Garry (not connected to videoconference endpoint) | Garry |

Figure 3:
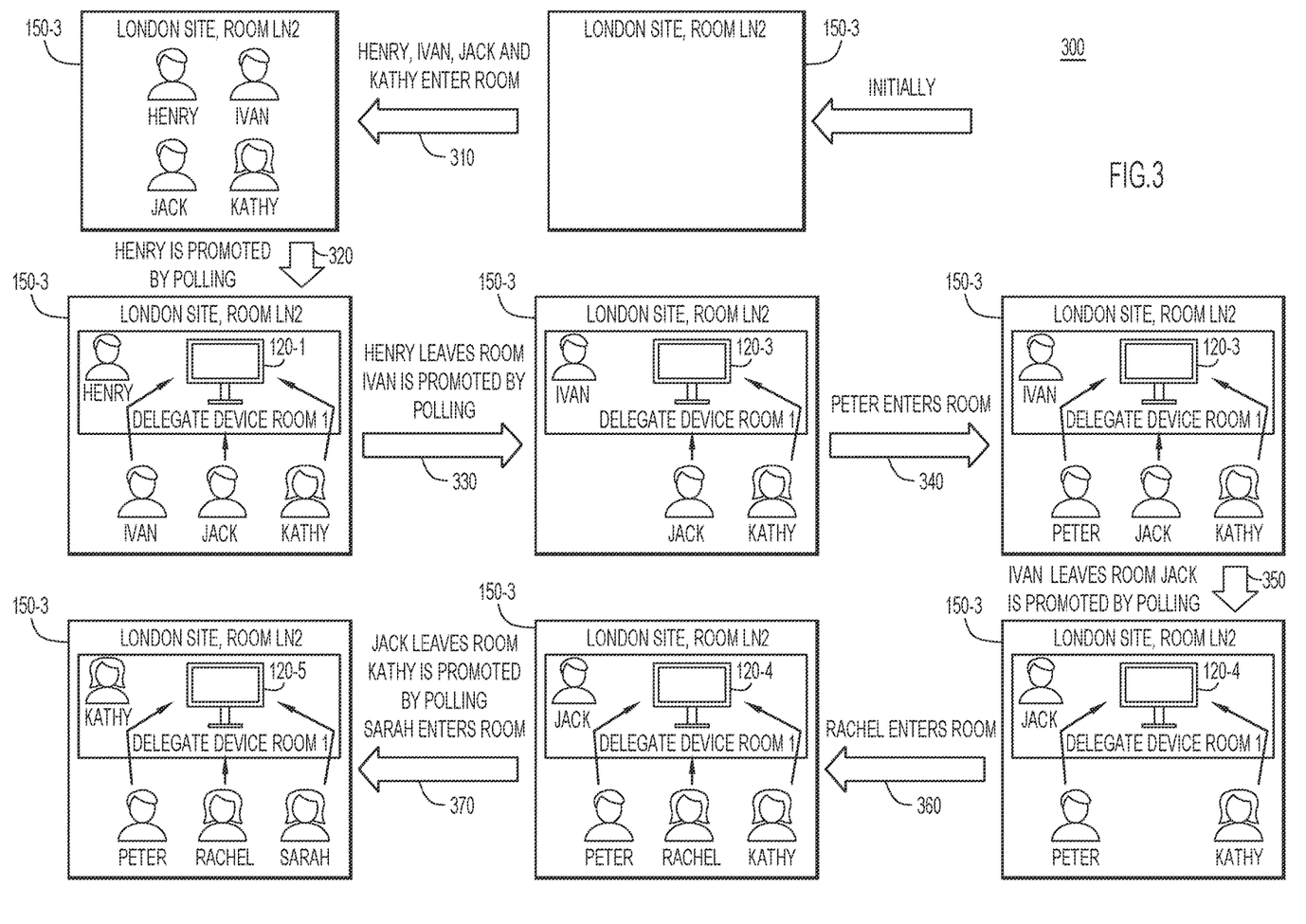
FIG. 3 is a diagram depicting a method for performing polling to determine a delegate device, according to an example embodiment.

Polling may be performed to determine a new delegate device when a previous delegate device leaves the room or is no longer connected to the meeting for another reason. The polling for a new delegate device is done in a self-organized way. When a new delegate device is needed, the Reference in now made to FIG. 3. FIG. 3 is a diagram depicting a method 300 for performing polling to determine a delegate device, according to an example embodiment. The method 300 may be performed by one of the user devices 120-1 to 120-N.

As shown in FIG. 3, initially, no users are present in environment 150-3. As illustrated at 310, users Henry, Ivan, Jack, and Kathy enter the room (Room LN2). When the participants join the meeting, no videoconference endpoint can be detected by the meeting clients on the user devices because there is no videoconference endpoint in environment 150-3 to emit any signal. In this case, as shown at 320, the first meeting client in Room LN2, e.g. Henry's user device 120-1, takes the role of a delegate device. Henry's user device 120-1 emits a signal (radio frequency (RF) wireless signal, ultrasound signal, etc.) with information associated with the online meeting. The user devices associated with the other participants (i.e., Ivan, Jack, and Kathy) will connect to Henry's user device 120-1 and report their location and the identifier associated with Henry's user device 120-1 to meeting server(s) 110 when those user devices join the meeting.

Continuing with FIG. 3, as shown at 330, Henry may leave the room and polling may be performed to determine which user device will become the new delegate device. There is a heartbeat detection for each participant in the room to ensure that the users have not left the room. If the current participant associated with the delegate device (e.g., Henry) leaves the room, a polling process may be performed among the remaining participants in the room (e.g., Ivan, Jack, and Kathy) to determine which user device will be the new delegate device. Once the current delegate device of Henry has not been detected for a period of time (e.g., 5 seconds), the participants in the room will wait for a period of time (e.g. 235 milliseconds), and then determine whether a new delegate device is detected. If a new delegate device has not been detected after the period of time has expired, a user device of another participant in the room (e.g., Ivan) may emit a signal claiming "I'm the new delegate device with device number 23456." When the user devices of the other participants in the room detect the signal, the user devices will connect to the new delegate device 120-3 and report to the meeting server: "I'm connected to a new delegate device with number 23456 in Room1." After that, Ivan's user device 120-3 is the new delegate device with the same device number 23456 and same room name derived from the previous delegate device 120-1 in Room LN2. The other user devices in the room are affiliated with the new delegate device.

When a new user enters environment 150-3, the user device of the new user may connect to the new delegate device 120-3. As shown at 340 in FIG. 3, Peter may enter the room, detect the signal emitted by Ivan's user device 120-3, and connect to Ivan's user device 120-3. Peter may additionally report to the meeting server(s) 110: "I'm connected to a delegate device with number 23456 in Room1." As shown by arrow 350, Ivan leaves the room and Jack's user device 120-4 is promoted to delegate device based on polling. For example, when Ivan leaves the room and Ivan's delegate device 120-3 has not been detected for a period of time, the participants in the room (i.e., Peter, Jack, and Kathy) will wait for a period of time and then determine whether a new delegate device is detected. If a new delegate device has not been detected after the period of time has expired, a user device of another participant in the room (e.g., Jack) will emit a signal claiming "I'm the new delegate device with device number 23456." The user devices of Peter and Kathy will connect to the new delegate device (i.e., Jack's user device 120-4) and report to the meeting server(s) 110: "I'm connected to a new delegate device with number 23456 in Room1."

As shown at 360, Rachel may enter the room and Rachel's user device may connect to Jack's delegate device 120-4 and report to meeting server(s) 110 "I'm connected to a delegate device with number 23456 in Room1." After a period of time, as shown at 370, Jack may leave the room and Kathy's user device 120-5 may be promoted to delegate device in a manner similar to the manner described above. In addition, Sarah may enter the room, connect to Kathy's delegate device 120-5 and report to meeting server(s) 110 "I'm connected to a delegate device with number 23456 in Room1."

Figure 4:
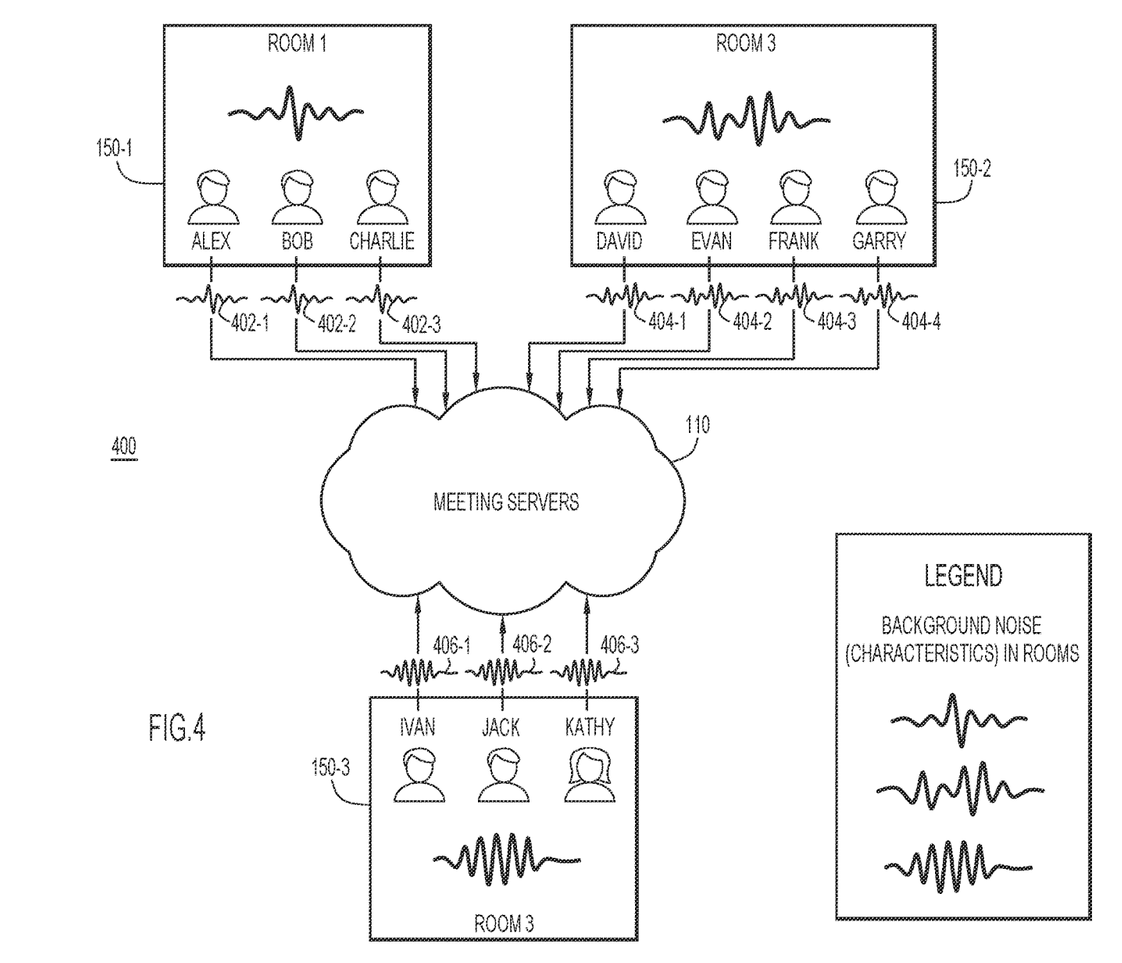
FIG. 4 is a diagram depicting a method for transmitting background noise characteristics useful for determining breakout session groups, according to an example embodiment.

Reference in now made to FIG. 4, with continued reference to FIGS. 1-3. FIG. 4 is a diagram depicting a method 400 for determining locations of user devices based on background noise characteristics, according to an example embodiment. The method 400 may be performed by one of the user devices 120-1 to 120-N and/or meeting server(s) 110 of FIG. 1.

As shown in FIG. 4, users in environments 150-1 to 150-3 are participating in an online meeting. In this scenario, environments 150-1 to 150-3 are rooms without videoconference endpoints 140 and the user devices in the room are unable to connect to a delegate device. For example, if audio broadcast is turned off for each participant's user device, device affiliation will not work and locations of users can be determined in a different manner.

In the example shown in FIG. 4, each user device in a room captures raw environment audio, extracts environment noise characteristics, and transmits the characteristics information and a timestamp indicating when the audio was captured to meeting server(s) 110 on a periodic basis. For example, in environment 150-1, Alex's user device may transmit signal 402-1 to meeting server(s) 110, Bob's user device may transmit signal 402-2 to meeting server(s) 110, and Charlie's user device may transmit signal 402-3 to meeting server(s) 110 indicating the environment noise characteristics in Room 1. Similarly, the user devices in environment 150-2 may transmit signals 404-1, 404-2, 404-3 and 404-4 to meeting server(s) 110 indicating the environment noise characteristics in Room 2 and the user devices in environment 150-3 may transmit signals 406-1, 406-2 and 406-3 to meeting server(s) 110 indicating the environment noise characteristics in Room 3.

By comparing the environment noise characteristics detected by each participant and the timestamps when the environment audio was captured, the meeting server(s) 110 is able to determine which participants are located in the same location and participants in the same location can be assigned to the same breakout session. For example, meeting server(s) 110 may determine that signals 402-1 to 402-3 that were received at a particular time include the same or similar noise characteristics and, therefore, the user devices that transmitted signals 402-1 to 402-3 are in the same location.

The environment noise characteristics extraction can be done by either a meeting client on a user device or by meeting server(s) 110. In addition, there are several options for the timing for environment noise characteristics extraction. In one implementation, the environment noise characteristics may be extracted periodically (e.g., every 5 seconds). In another implementation, the environment noise characteristics may be extracted on demand when a breakout session is initiated by the meeting host or cohost.

Background noise characteristics can be used to determine location even if some participants in a room have muted their user devices. For example, participants in the same meeting room or environment may turn on audio input/output for only one user device in the room and disable audio input/output for the other user devices in the room. Turning on audio input/output for a single user in a room may provide for a better audio user experience by, for example, eliminating echo in the room. The muted user devices will still capture audio input silently and transmit the audio characteristics to meeting server(s) 110. For example, for environment 150-1 shown in FIG. 3, assume that Alex is unmuted and Bob and Charlie are muted. Although the user devices of Bob and Charlie are muted, all user devices of Alex, Bob, and Charlie will capture environment noise and extract noise characteristics. Even if Bob's and Charlie's user devices are muted, the user devices will capture audio input silently and transmit the audio to meeting server(s) 110. Since Bob and Charlie have muted their user devices, meeting server(s) 110 will recognize only the environment noise characteristics from the audio received from Bob's and Charlie's user devices. Meeting server(s) 110 will not mix audio from Bob and Charlie or broadcast Bob's and Charlie's audio in the meeting.

In another similar scenario, participants in the same meeting room may not participate in the meeting using audio from their user devices and may instead dial into the meeting using an Internet Protocol (IP) phone in the room. In this scenario, all user devices of the users (e.g., Alex, Bob, and Charlie) in the environment 150-1, for example, will capture environment noise silently, extract characteristics, and transmit the characteristics to meeting server(s) 110 for automatically determining the session assignment for breakout rooms. The audio received from Alex, Bob, and Charlie's user devices will not be mixed or broadcast in the meeting.

In the examples discussed above, meeting server(s) 110 may be able to determine location-based breakout room assignments for users without relying on device affiliation detection.

Figure 5:
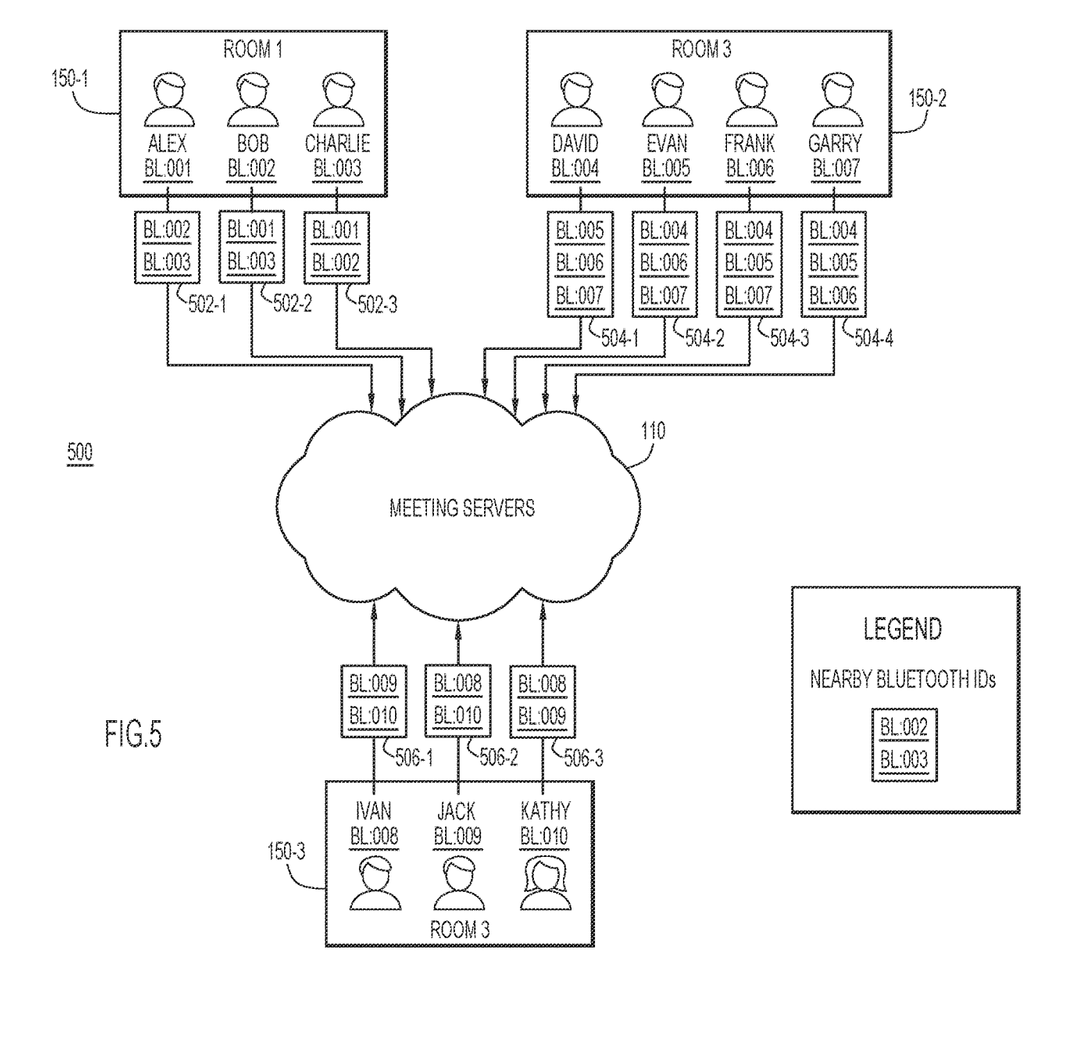
FIG. 5 is a diagram depicting a method for transmitting detected short-range wireless system identifiers for determining breakout session groups, according to an example embodiment.

Referring now to FIG. 5, FIG. 5 is a diagram depicting a method 500 for determining locations of user devices based on short-range wireless communication identifiers, according to an example embodiment. The method 500 may be performed by one of the user devices 120-1 to 120-N and/or meeting server(s) 110 of FIG. 1.

As is illustrated in FIG. 5, short-range wireless communication (e.g., Bluetooth) identifiers can be discovered by nearby user devices. FIG. 5 illustrates an example in which Bluetooth identifiers are discovered by neighboring user devices, but any short-range wireless communication identifiers can be used in a similar manner. In the example shown in FIG. 5, each meeting participant can associate his or her identity in the meeting with his or her unique Bluetooth identifier and report the association to the meeting server(s) 110. Each participant may transmit information indicating nearby Bluetooth identifiers that have been discovered by each participant. The Bluetooth identifiers of nearby user devices can be retrieved regularly or on-demand when a breakout session is initiated by the meeting host. In this way, the meeting server(s) 110 is able to know which participants are mutually discovered via Bluetooth and the nearby participants can be assigned to the same session automatically.

For example, in environment 150-1, Alex's identity is associated with Bluetooth identifier 001, Bob's identity is associated with Bluetooth identifier 002, and Charlie's identity is associated with Bluetooth identifier 003. Alex's user device may transmit signal 502-1 to meeting server(s) 110 indicating that Alex's user device has discovered Bluetooth identifiers 002 and 003. Similarly, Bob's user device may transmit signal 502-2 to meeting server(s) 110 indicating that Bob's user device has discovered nearby Bluetooth identifiers 001 and 003 and Charlie's user device may transmit signal 502-3 to meeting server(s) 110 indicating that Charlie's user device has discovered nearby Bluetooth identifiers 001 and 002. Based on receiving the detected Bluetooth identifiers, meeting server(s) 110 can determine which participants are in the same location and may determine location-based breakout sessions.

Using the same method, in environment 150-2, David's user device (with a. Bluetooth identifier of 004) may transmit message 504-1 to meeting server(s) 110 indicating that Bluetooth identifiers 005, 006, and 007 have been detected, Evan's user device (with a Bluetooth identifier of 005) may transmit message 504-2 to meeting server(s) 110 indicating that Bluetooth identifier 004, 006, and 007 have been detected, Frank's user device (with a Bluetooth identifier of 006) may transmit message 504-3 to meeting server(s) 110 indicating that Bluetooth identifiers 004, 005, and 007 have been detected, and Garry's user device (with a Bluetooth identifier of 007) may transmit message 504-4 to meeting server(s) 110 indicating that Bluetooth identifiers 004, 005, and 006 have been detected. Meeting server(s) 110 may receive messages 504-1 to 504-4 and determine that David, Evan, Frank, and Garry are in the same room and should be placed in the same breakout session.

In environment 150-3, Ivan's user device (with a Bluetooth identifier of 008) may transmit a message to meeting server(s) 110 indicating that Bluetooth identifiers 009 and 010 have been detected, Jack's user device (with a Bluetooth identifier of 009) may transmit a message to meeting server(s) indicating that Bluetooth identifier 008 and 010 have been detected, and Kathy's user device (with a Bluetooth identifier of 010) may transmit message 506-3 to meeting server(s) indicating that Bluetooth identifiers 008 and 009 have been discovered. Meeting server(s) 110 may determine based on messages 506-1, 506-2 and 506-3 that Ivan, Jack, and Kathy are in the same room and should be placed in the same breakout session.

In addition to determining locations of meeting participants by receiving nearby Bluetooth identifiers, meeting server(s) 110 may determine locations of meeting participants in additional ways. For example, when the meeting host initiates breakout sessions, the meeting server(s) 110 may query each meeting participant for his or her geo-location. Most wireless user devices (e.g., Smartphones and tablets) have geo-location capability that may be used by the meeting server(s) 110 for the purposes described herein. Based on receiving responses from the participants, the meeting server(s) 110 may calculate which groups of participants are physically located in the same area.

For example, the responses from the participants may indicate that Alex, Bob, and Cindy are each in a small area of 25 square meters while David, Evan, and Frank are each in a small area of about 30 square meters that is a larger distance (e.g., 20 meters, 10 kilometers, etc.) away from the first group of Alex, Bob, and Cindy. Therefore, the meeting server(s) 110 may determine that Alex, Bob and Cindy are in a first location and are assigned to breakout session 1, and David, Evan and Frank are in a second location and are assigned to breakout session 2 automatically. The assignment can be done by leveraging various location-based algorithms.

Location-based breakout room assignments may also be determined using facial and voiceprint recognition. For example, a meeting device (e.g., a user device, a videoconference endpoint, or another device) may capture an image of participants in its field of view and may determine an identity associated with each participant using facial recognition techniques. The participants recognized in the field of view may be automatically assigned to the same breakout session. In addition, voiceprint recognition may be leveraged to recognize participants outside of the device's field of view. For example, a participant not captured in the image or who cannot be recognized using facial recognition may be identified based on a voiceprint associated with the participant. A list of meeting participants may be used as a reference for the facial and/or voiceprint recognition.

Figure 6:
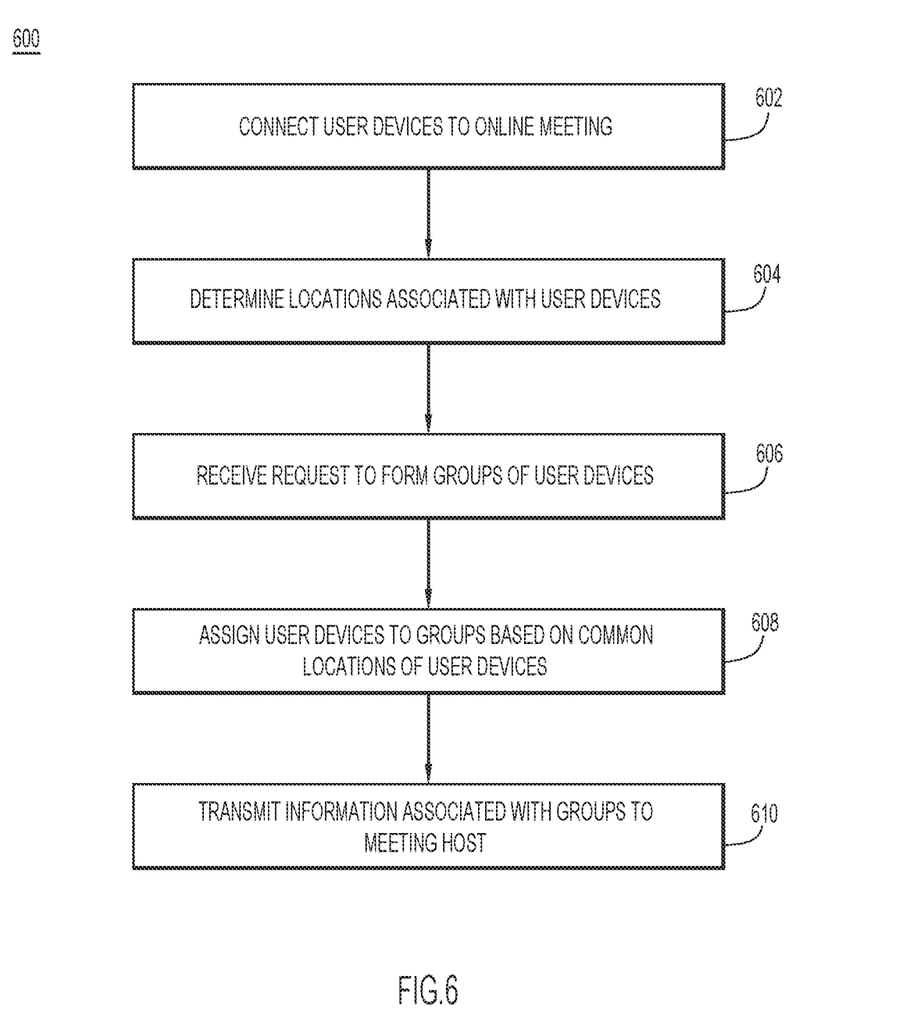
FIG. 6 is a flowchart illustrating a method for determining location-based breakout session groups, according to an example embodiment.

Referring to FIG. 6, FIG. 6 is a flow diagram illustrating a method 600 of automatically determining groups of user devices for breakout sessions in an online meeting based on the locations of the user devices. The method 600 may be implemented by a computing device such as one of the user devices 120-1 to 120-N of FIG. 1, a videoconference endpoint 140 of FIG. 1, and/or the meeting server(s) 110 of FIG. 1. For example, one of the meeting server(s) 110 may implement the method 600 based on information received from one of the user devices 120-1 to 120-N or from a videoconference endpoint 140.

At 602, the method 600 involves connecting user devices 120-1 to 120-N to an online meeting or communication session. For example, meeting server(s) 110 may facilitate an online meeting or communication session among user devices 120-1 to 120-N in different geographical locations over network(s) 130 using audio and/or video. User devices 120-1 to 120-N may display information associated with other user devices 120-1 to 120-N participating in the online meeting and users may be able to communicate with the users of other user devices 120-1 to 120-N all at the same time or individually.

At 604, the method 600 involves determining locations associated with the user devices participating in the online meeting. Meeting server(s) 110 may determine the locations in a number of ways. For example, meeting server(s) 110 may determine the locations based on a videoconference endpoint or a user device to which user devices in a room are connected/associated. Meeting server(s) 110 may additionally determine the locations based on background noise characteristics in a room in which users are participating in the online meeting. Meeting server(s) 110 may determine the locations based on Bluetooth identities associated with user devices participating in the online meeting. Meeting server(s) 110 may determine the locations based on geo-locations provided by users participating in the online meeting. Meeting server(s) 110 may determine the locations based on facial and/or voiceprint recognition techniques associated with users participating in the online meeting.

At 606, the method 600 involves receiving a request to form groups of user devices for breakout sessions. A meeting host or cohost may send a request to meeting server(s) 110 to automatically form groups of the participants for conducting smaller meetings or breakout/child sessions. The request may include a request to form the groups based on locations of the user devices 120-1 to 120-N. For example, the request may indicate that a subset of user devices 120-1 to 120-N in the same room, in a common location, or within a particular distance of each other should be placed in the same group or breakout session. Alternatively, meeting server(s) 110 may automatically determine that the groups for the breakout session should be location-based. In one implementation, meeting server(s) 110 may suggest location-based breakout sessions and the meeting host or cohost can accept the suggestion based on, for example, selecting an option on a user device.

At 608, the method 600 involves assigning user devices 120-1 to 120-N to groups based on common locations of the user devices. For example, meeting server(s) 110 may assign user devices to a group of user devices based on those user devices being connected/associated to the same videoconference endpoint or the same user device in a room or environment. Meeting server(s) 110 may assign user devices to a group based on determining that user devices in the group are in the same environment (at a common location) based on background noise characteristics. Meeting server(s) 110 may assign user devices to a group based on determining that user devices are in the same location based on Bluetooth identifiers associated with the user devices. Meeting server(s) 110 may assign user devices to a group based on receiving geo-location information from users participating in the meeting and grouping the users that are in a similar location. Meeting server(s) 110 may assign user devices to a group based on facial recognition and/or voiceprint associated with users in a field of view or voices within a distance of a microphone of a user device or of a videoconference endpoint. Regardless of the particular technique to determine respective locations of the user devices, step 608 involves assigning user devices to respective ones of the plurality of groups based on the respective locations such that user devices at a common location are assigned to a same group.

At 610, the method 600 involves transmitting information associated with the groups to the meeting host or cohost. For example, meeting server(s) 110 may transmit a list of groups of users or user devices to the meeting host or cohost. The meeting host or cohost may determine to automatically form breakout sessions using the location-based groups suggested by meeting server(s) 110 (e.g., by selecting an option accepting the proposed groups). Users participating in the meeting may be broken into smaller online meetings or breakout or child sessions based on the groups. Users can view information associated with and interact with other users in the breakout or child session after the groups have been formed. Users in one breakout session or child session may not be able to view or interact with users in other breakout sessions or child sessions.

Figure 7:
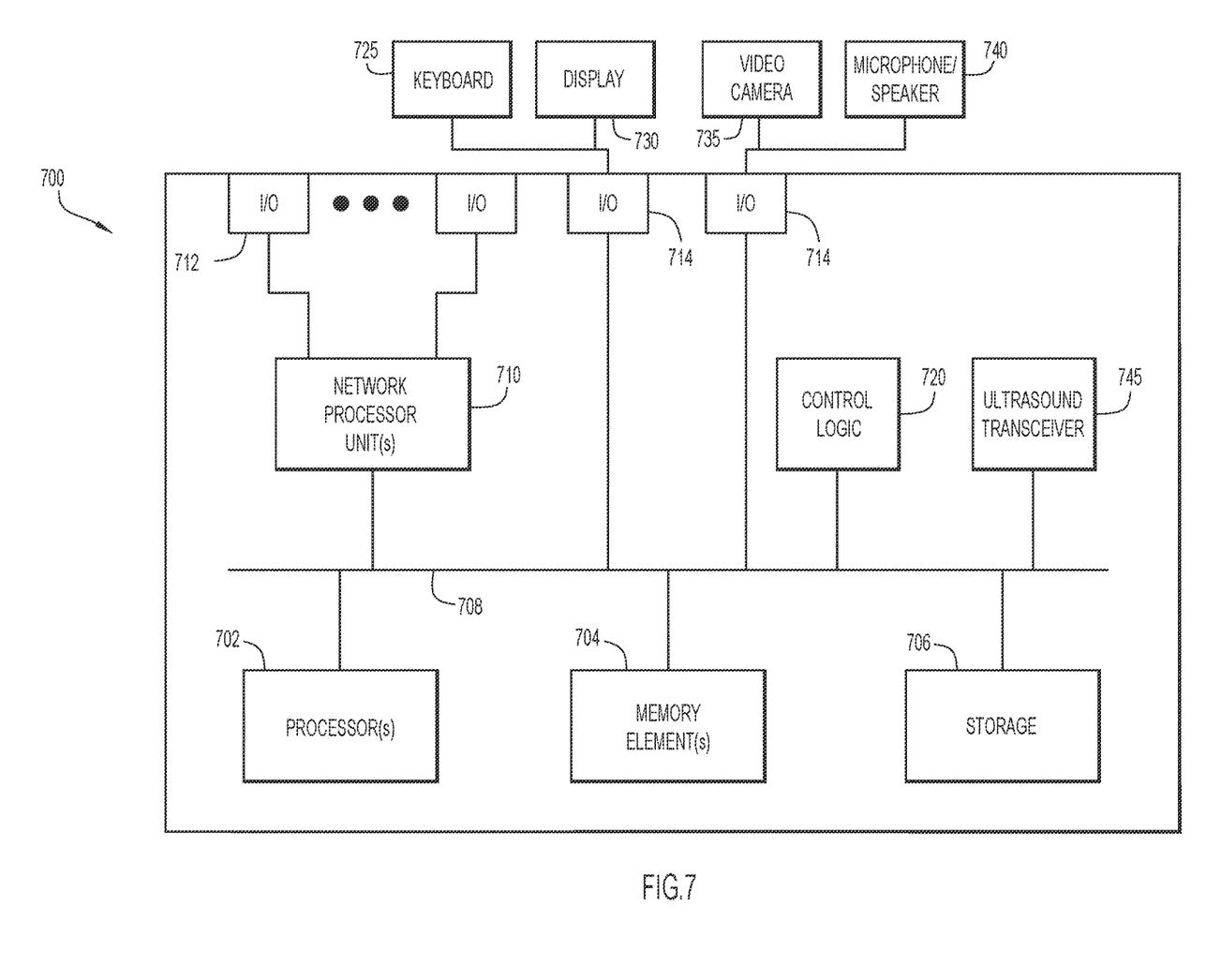
FIG. 7 is a hardware block diagram of a computer device that may be configured to perform the user device based operations involved in establishing location-based breakout sessions, according to an example embodiment.

Referring to FIG. 7, FIG. 7 illustrates a hardware block diagram of a computing/computer device 700 that may perform functions of a user device associated with operations discussed herein in connection with the techniques depicted in FIGS. 1-6. In various embodiments, a computing device, such as computing device 700 or any combination of computing devices 700, may be configured as any devices as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard 725, keypad, a touch screen, and/or any other suitable input and/or output device now known or hereafter developed. This may be the case, in particular, when the computer device 700 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 730 shown in FIG. 7, particularly when the computer device 700 serves as a user device as described herein. Display 730 may have touch-screen display capabilities. Additional external devices may include a video camera 735 and microphone/speaker combination 740. In addition, the computing device 700 may further include an ultrasound transceiver 745 that may be used for the various purposes described herein.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 8:
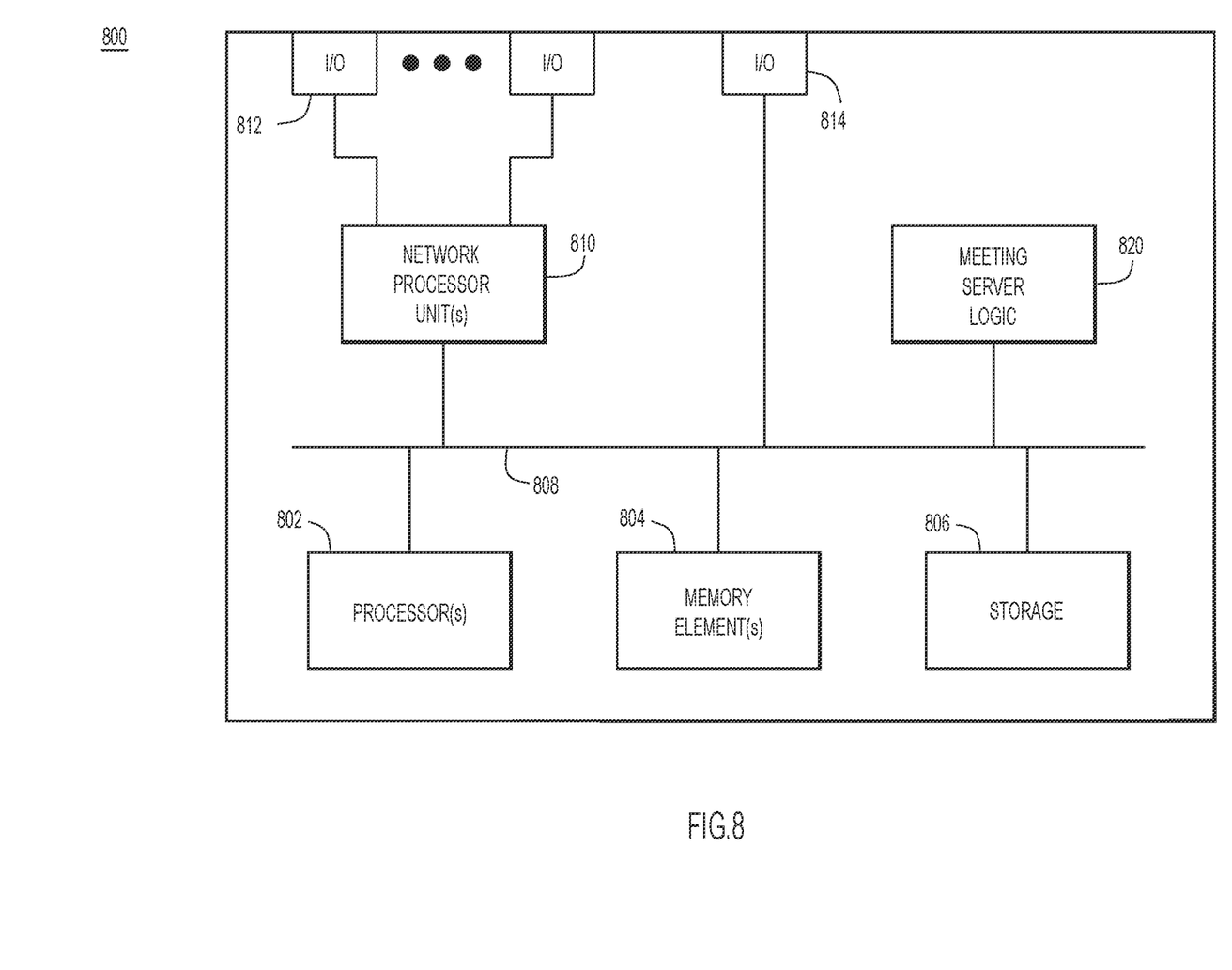
FIG. 8 is a hardware diagram of a computer device that may be configured to perform the meeting server operations involved in establishing location-based breakout sessions, according to an example embodiment.

FIG. 8 illustrates a block diagram of a computing device 800 that may perform the functions of the meeting server(s) 110 described herein. The computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and meeting server logic 820. In various embodiments, instructions associated with the meeting server logic 820 is configured to perform the meeting server operations described herein, including those depicted by the flow chart for method 600 shown in FIG. 6.

In one form, a method is provided comprising connecting a plurality of user devices to a communication session in which a plurality of participants of the respective plurality of user devices communicate using audio and/or video; determining respective locations of the plurality of user devices; receiving, from a particular user device of the plurality of user devices, a request to group the user devices into a plurality of groups to form one or more breakout communication sessions off of the communication session; assigning user devices to respective ones of the plurality of groups based on the respective locations such that user devices at a common location are assigned to a same group; and transmitting information identifying the plurality of groups to the particular user device.

In one example, the method may include receiving information associated with a conference endpoint to which one or more user devices, of the plurality of user devices, is associated. In another example, the method may include receiving information associated with a first user device, of the plurality of user devices, to which one or more other user devices, of the plurality of user devices, is associated. In another example, the first user device emits a signal that includes information associated with the communication session and the one or more other user devices connects to the first user device in response to detecting the signal.

In another example, the method may include receiving an indication that the first user device has disconnected from the communication session and receiving information associated with a second user device, of the plurality of user devices, to which the one or more other user devices is associated. In another example, the second user device emits a signal when the first user device has disconnected from the communication session and the one or more other user devices connects to the second user device in response to detecting the signal. In another example, the method may include receiving environment noise characteristics associated with one or more user devices of the plurality of user devices. In another example, the method may include receiving one or more of short-range wireless communication information, geo-location information, facial recognition information, or voiceprint information associated with one or more user devices of the plurality of user devices.

In another form, an apparatus is provided comprising a memory; a network interface configured to enable network communications; and a processor, wherein the processor is configured to perform operations comprising: connecting a plurality of user devices to a communication session in which a plurality of participants of the respective plurality of user devices communicate using audio and/or video; determining respective locations of the plurality of user devices; receiving, from a particular user device of the plurality of user devices, a request to group the user devices into a plurality of groups to form one or more breakout communication sessions off of the communication session; assigning user devices to respective ones of the plurality of groups based on the respective locations such that user devices at a common location are assigned to a same group; and transmitting information identifying the plurality of groups to the particular user device.

In still another form, one or more non-transitory computer readable storage media encoded with instructions are provided that, when executed by a processor, cause the processor to execute a method comprising: connecting a plurality of user devices to a communication session in which a plurality of participants of the respective plurality of user devices communicate using audio and/or video; determining respective locations of the plurality of user devices; receiving, from a particular user device of the plurality of user devices, a request to group the user devices into a plurality of groups to form one or more breakout communication sessions off of the communication session; assigning user devices to respective ones of the plurality of groups based on the respective locations such that user devices at a common location are assigned to a same group; and transmitting information identifying the plurality of groups to the particular user device.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   connecting a plurality of devices to a communication session in which a plurality of participants communicate using audio and/or video, wherein each of the plurality of participants is associated with at least one device of the plurality of devices;
   determining that a first device and a second device are at a common location, wherein the first device and the second device are in the plurality of devices;
   receiving, from a particular device of the plurality of devices, a request to group the plurality of devices into a plurality of groups to form breakout communication sessions associated with the communication session;
   assigning each device of the plurality of devices to a respective group of the plurality of groups, wherein the first device and the second device are assigned to a first group of the plurality of groups based at least in part upon determining that the first device and the second device are at the common location; and
   transmitting information identifying the plurality of groups to the particular device.

2. The method of claim 1, wherein the common location is a room, and the first device and the second device are located in the room.

3. The method of claim 1, wherein the first device and the second device are determined to be in the common location based at least in part upon sound detected by a microphone associated with the first device or the second device.

4. The method of claim 3, wherein the sound is associated with voices of one or more participants of the plurality of participants.

5. The method of claim 3, wherein the sound is background noise.

6. The method of claim 3, wherein the sound is an ultrasonic signal.

7. The method of claim 6, wherein the microphone is associated with the first device, and the second device emits the ultrasonic signal.

8. The method of claim 1, wherein the first device and the second device are determined to be in the common location based at least in part upon wireless communication information received by a receiver associated with the first device or the second device.

9. The method of claim 8, wherein the wireless communication information is related to Bluetooth wireless communication protocol.

10. The method of claim 8, wherein the receiver is associated with the first device, and the second device transmits the wireless communication information.

11. An system comprising:
one or more memories storing instructions; and
one or more processors, operatively coupled to the one or more memories, for executing the instructions to cause performance of:
connecting a plurality of devices to a communication session in which a plurality of participants communicate using audio and/or video, wherein each of the plurality of participants is associated with at least one device of the plurality of devices;
determining that a first device and a second device are at a common location, wherein the first device and the second device are in the plurality of devices;
receiving, from a particular device of the plurality of devices, a request to group the plurality of devices into a plurality of groups to form breakout communication sessions associated with the communication session;
assigning each device of the plurality of devices to a respective group of the plurality of groups, wherein the first device and the second device are assigned to a first group of the plurality of groups based at least in part upon determining that the first device and the second device are at the common location; and
transmitting information identifying the plurality of groups to the particular device.

12. The system of claim 11, wherein the common location is a room, and the first device and the second device are located in the room.

13. The system of claim 11, wherein the first device and the second device are determined to be in the common location based at least in part upon sound detected by a microphone associated with the first device or the second device.

14. The system of claim 13, wherein the sound is an ultrasonic signal, the microphone is associated with the first device, and the second device emits the ultrasonic signal.

15. The system of claim 11, wherein the first device and the second device are determined to be in the common location based at least in part upon wireless communication information received by a receiver associated with the first device or the second device.

16. One or more non-transitory computer-readable media storing instructions which, when executed by one or more processors, cause:
connecting a plurality of devices to a communication session in which a plurality of participants communicate using audio and/or video, wherein each of the plurality of participants is associated with at least one device of the plurality of devices;
determining that a first device and a second device are at a common location, wherein the first device and the second device are in the plurality of devices;
receiving, from a particular device of the plurality of devices, a request to group the plurality of devices into a plurality of groups to form breakout communication sessions associated with the communication session;
assigning each device of the plurality of devices to a respective group of the plurality of groups, wherein the first device and the second device are assigned to a first group of the plurality of groups based at least in part upon determining that the first device and the second device are at the common location; and
transmitting information identifying the plurality of groups to the particular device.

17. The one or more non-transitory computer-readable media of claim 16, wherein the common location is a room, and the first device and the second device are located in the room.

18. The one or more non-transitory computer-readable media of claim 16, wherein the first device and the second device are determined to be in the common location based at least in part upon sound detected by a microphone associated with the first device or the second device.

19. The one or more non-transitory computer-readable media of claim 18, wherein the sound is an ultrasonic signal, the microphone is associated with the first device, and the second device emits the ultrasonic signal.

20. The one or more non-transitory computer-readable media of claim 16, wherein the first device and the second device are determined to be in the common location based at least in part upon wireless communication information received by a receiver associated with the first device or the second device.

* * * * *